United States Patent [19]
Fridman

[11] 3,950,544
[45] Apr. 13, 1976

[54] PREPARATION OF YOGURT FROM SOYBEAN MEAL

[75] Inventor: Eliahu Fridman, Haifa, Israel

[73] Assignee: Centre for Industrial Research Ltd., Haifa, Israel

[22] Filed: Jan. 18, 1974

[21] Appl. No.: 434,625

[30] Foreign Application Priority Data
Feb. 19, 1973   Israel.................................... 41570

[52] U.S. Cl. ...................... 426/46; 426/34; 426/43; 426/431; 426/583; 426/656
[51] Int. Cl.².. A23L 1/20; A23C 9/12; A23C 11/00
[58] Field of Search ......... 426/34, 43, 364, 431, 46, 426/583, 656

[56] References Cited
UNITED STATES PATENTS

| | | | |
|---|---|---|---|
| 2,881,076 | 4/1959 | Sair | 426/431 X |
| 3,025,165 | 3/1962 | Metzger | 426/43 X |
| 3,096,177 | 7/1963 | Ariyama et al. | 426/43 X |
| 3,642,490 | 2/1972 | Hawley et al. | 426/364 |

Primary Examiner—David M. Naff
Attorney, Agent, or Firm—John S. Roberts, Jr.

[57]   ABSTRACT

A non-Dairy yogurt is prepared by leaching soybean meal with an aqueous solution having a pH of 4 to 5 to remove sugars without removing protein, leaching a resultant residual sugar-free cake with an aqueous solution having a pH above 7 to dissolve protein material, adjusting the pH of a resulting protein-containing filtrate to 6.5 to 7.0, adding sugar to the filtrate and homogenizing to produce a soymilk, sterilizing the soymilk at about 116°C, and fermenting the sterile soymilk with a lactic culture to produce yogurt.

8 Claims, No Drawings

PREPARATION OF YOGURT FROM SOYBEAN MEAL

The present invention relates to a method for the manufacture of non-dairy yogurt from soybean meal. The soybean meal preferable for the present invention is the so-called uncalcined meal obtained by heating the soybean meal during the desolventizing below 70°C.

The greatest drawback to the use of soybeans as a source of human food product is the beany taste and the objectionable odour and colour of such products. Thus, for example, the conventionally marketed soybean milk has an unattractive appearance and is vastly different in flavour from cow's milk and is often found unpalatable by those accustomed to cow's milk.

Yogurt is one of the oldest fermented foods known to mankind. Its renewed popularity has increased over the last few years in view of the better quality achieved and, in particular, due to the introduction of many flavours and fruits.

A typical yogurt contains about 84% moisture, 2% fat, 7% protein and 7% carbohydrates (mainly lactose) and is characterized by its curd texture and lactic flora. In the last few years, the trend towards low-calorie food has increased and several attempts to produce "dietary yogurt" have been reported. Thus, in "Dairy Industries" of December 1970 (pages 827–830), there is an article by J. G. Davis on "dietary yogurt" in which the author suggests a new formulation for yogurt, wherein milk fat is omitted and skimmed milk containing skimmed milk powder is the medium reinforced by the right growth factors. The addition of up to 1.5% of vegetable oils such as soya oil is also suggested; however, more than 1.5% of soya oil should be avoided in view of the characteristic flavour of the soya material.

An artificial yogurt prepared from soybeans is reported by some Japanese workers in U.S. Pat. No. 3,096,177. According to this patent, washed soybeans are steamed, soaked and milled in a caustic soda solution. The filtrate obtained is neutralized with an acid, sugar is added, the liquor is sterilized and then the milk yogurt is added or the filtrate is inoculated with *Lactobacillus bulgaricus* and incubated. The main disadvantages of the product obtained are the beany off-flavour, the colour and the relatively high percentage of certain carbohydrates naturally present in soybeans which, via metabolism pathway, causes flatulance effects.

It is the object of the present invention to describe a method for the manufacture of non-dairy yogurt from soybean meal. It is another object of the present invention to describe a method for the manufacture of non-dairy yogurt based on soybean meal being lactose-free and animal-fat-free. It is yet another object of the present invention to describe a method for the manufacture of non-dairy yogurt which is characterized by its improved texture, taste and palatability. These, and other objects of the invention which may appear and be appreciated by those skilled in the art as this specification proceeds, are achieved by this invention.

The invention, therefore, consists of a method for the manufacture of non-dairy yogurt based on soybean meal which, in combination, comprises the steps of (1) leaching the soybean meal by an aqueous solution having a pH in the range of 4–5; (2) removal of the filtrate; (3) leaching of the residual cake by an aqueous solution having a pH of above 7.0; (4) removal of solids from the resulting solutions; (5) adjusting the pH of the filtrate to a value in the range of 6.5 to 7.0; (6) addition of sugar and homogenization of the soymilk filtrate; (7) sterilization of the homogenized soymilk; (8) inoculation of the sterilized soymilk by a lactic culture and (9) incubation of the fermented soymilk in obtaining the non-dairy yogurt.

According to the method of the present invention, it was unexpectedly found that a non-dairy yogurt is achieved which has an excellent texture and is free of the characteristic beany taste of the soya. Moreover, the product obtained is completely "parve" and is free of lactose. According to the method, the sugars constituents are eliminated during the leaching step, thus resulting in a sugar-free, fat-free material. If required, any fatty material or sucrose may be added in the homogenization step, thus obtaining any desired product. This is another advantage of the method, which permits obtaining a non-dairy yogurt having a broad range of different qualities according to any specific requirement. The entire method is carried out under controlled and relatively very mild conditions of temperature and reaction time, so as to impart the desired flavour with minimal protein degradation and, at the same time, removing the undesirable constituents of the soybean. The product obtained is characterized by a relatively long shelf life, which is quite important for a fermented product of the yogurt type.

Step (1) consists of the leaching of the soybean meal by an aqueous solution having a pH in the range of 4–5 and preferably in the range of 4.2 to 4.6. By carrying out the leaching in this pH range, all the sugars are removed whereas only a minimal leaching of the protein constituents takes place. Together with the sugars, other undesirable constituents normally present in the soybeans, such as certain enzyme systems, ash, and bean-flavoured substances, are leached out. In order to obtain a complete removal of the sugars and other undesirable constituents and/or to remove the mother liquor adhereing to the cake, it is preferable to repeat the leaching operation with a fresh aqueous solution having the same pH in the range of 4–5 or with plain water. The aqueous solution used in the leaching operation, having the above-mentioned pH range, may be obtained by the use of any edible acid or acidic salts such as citric acid, hydrochloric acid etc. It was found that the above pH range is quite critical; using an acidic solution outside this range, sugar removal is still achieved but, in this case, some of the glycinin, which is the principal protein of soybeans, is also leached out.

Step (2) consists of separation of the filtrate from the sugar-free cake. This operation is carried out by conventional solid-liquid separation techniques such as filtration, centrifugation or even sedimentation. The filtrate which results is discarded.

Step (3) consists of leaching out the proteinaceous material from the sugar-free cake by an aqueous alkaline solution. The purpose of this operation is to dissolve the maximum protein material without exceeding dilution of the filtrate which is further processed. Generally, the amount of aqueous alkaline solution used in this operation is between 6 to 10 parts alkaline solution to one part of the original soybean meal.

The alkali materials to be used in the aqueous solution are selected from the common compounds such as sodium hydroxide, sodium carbonate, ammonium hydroxide or the corresponding potassium compounds. The aqueous solution useful for this extraction operation must have a pH above 7.0; the preferred pH range is between 8 to 10.

Step (4) comprises the separation of solids from the alkali filtrate by decantation, by filtration under vacuum, filter press or centrifugation. It is preferable to carry out this separation in two stages; in the first stage, to remove most of the solids by decantation or filtration and, in the second one, by centrifugation, thus achieving a clear filtrate which can easily be further processed.

Step (5) requires a pH adjustment to a value in the range of 6.5 to 7.0 and preferably in the range of 6.6 to 6.8. The decrease in pH to 6.5 enables rapid growth of the bacteria in the later step of fermentation but a pH below 6.5 will cause precipitation of the proteinaceous material during the sterilization step. The preferred pH in the range of 6.6 to 6.8 is the comprise between the high pH at which the growth of bacteria is increased and the pH below 6.5 wherein protein precipitation is avoided. The pH adjustment is carried out by an edible acid such as citric acid, hydrochloric acid etc. The concentration of the acid used is not critical but should not be so high as to be capable of causing local damage to the soymilk; on the other hand, as small a volume of aqueous acid as is possible to be handled is preferred. The preferred concentration of the acid is between 0.3N and 1N.

In the next step (6), the soymilk is homogenized in the presence of added sugar. The sugar used in the homogenization step is selected to be compatible for utilization by the bacteria used in the inoculation step. For example, when *Streptococcus thermophilus* or *Lactobacillus bulgaricus* or their mixtures were used, the sugar selected was sucrose. Various other additives, according to specific taste and texture of the required product, may also be incorporated at this step. Examples of these additives are: water to adjust the protein content and improve the texture, starch, sugar (for sweetness), oils, lecithin and other additives or stabilizers which are controlled at the required level so as to impart to the product the desired texture and nutritional value. At this step, additional flavour reagents, colour and fruit essences may be incorporated. The sterilization step (7) is absolutely imperative. The soymilk consists of an adequate medium for the growth of micro-organisms which normally are present in soybeans. The heat treatment sterilizes the soymilk and destroys the anti-digestive factors present in the soybeans. The time of sterilization depends on the temperature reached but overheating should be avoided since it may cause precipitation of the protein.

Step (8) consists of the inoculation of sterile soymilk by a lactic culture grown on a non-dairy medium. The lactic culture added as starter belongs to the family of the lactic group and has to be selected in such a manner as to fulfil the main requirement of utilization of the sugar added in the homogenization step; examples of bacteria suitable are *Streptococcus thermophilus*, *Lactobacillus bulgaricus* etc. Generally, any strain of bacteria which belongs to the lactic group may be successfully used, provided that it is compatible with the above requirement. It is also possible to stir and mix the inoculated soymilk with fruit, jam, fortification reagents, colour etc.

The last step (9) is the incubation of the inoculated sterilized soymilk which results in the formation of a coagulum, accompanied by production of the final flavour in the non-dairy product. This is a common operation very similar to that encountered with ordinary milk to obtain dairy yogurt products. It is also possible to stir and mix the fermented yogurt with fruit, jam, fortification reagents, colour etc.

The incubation is carried out in any conventional equipment used in yogurt manufacture. The containers filled with the inoculated soymilk are placed in trays and introduced into special rooms at 37°–42°C for several hours until a pH in the range of 4.2 to 4.8 is achieved. The product is then cooled and stored in chilled rooms, thus obtaining the final consistency and pH of the non-dairy yogurt.

In order to illustrate further the nature of this invention and the manner of practicing it more fully, the following examples are presented merely for clearness of understanding thereof, without being limited thereto, as modifications will be obvious to those skilled in the art.

EXAMPLE 1

1000 Grams of uncalcined soybean meal (soybean meal desolventized below 70°C) were leached for 30 minutes at room temperature (23°–25°C) with 9 liters of water to which 900 ml of HCl 0.5N had been added in small portions, during vigorous stirring, until the pH of the slurry was 4.4. The mass was allowed to settle, the solids separated by gravitation and the excess liquid was removed by pressing on a cloth; an amount of 4.0 kilograms of wet cake was obtained. The cake was washed with two portions of 5 liters of an aqueous solution, each one containing 450 ml of HCl 0.5N. To the washed cake, 8 liters of water containing 340 ml of NaOH 6% were added and mixed for 30 minutes, until a pH of 9.0 was reached, the temperature of the reaction mass being around 55°C. The solids were removed after sedimentation and the filtrate was centrifugated in order to obtain a clarified solution free of any solid particles. The filtrate was then adjusted to a pH of 6.70 by slowly adding 120 ml of HCl (0.5N). An amount of 7.5 liters of filtrate was obtained, to which the following additives were incorporated: 225 grams of commercial sugar + 150 ml of soya oil + 40 grams of corn starch + 7 grams of lecithin. The solution was homogenized by vigorous agitation and the milk obtained was poured into ten glass bottles; for sterilization, the bottles were put into an autoclave and heated at 116°C for 4 minutes. The milk was quickly cooled to 40°C and inoculated with 160 ml of a freshly prepared culture of *Streptococcus thermophilus* as a lactic culture. After vigorous mixing, the solution obtained was poured into 50 containers of 170 ml which were introduced into an incubator at 40°C for 16 hours. At the end of the incubation, the bottles were put in a chiller, the pH of the plain, non-dairy yogurt obtained being 4.4–4.6.

EXAMPLE 2

1000 grams of the same uncalcined soybeans as used in Example 1 were leached as described in Example 1 with 10 liters of water containing 84 grams of citric acid (the acid being added in small portions), the pH of the mixture being 4.4. The solids were separated, the filtrate was treated with 360 ml of NaOH 6%, the pH of the mixture being 9.5, the solids were removed and the filtrate adjusted to a pH of 6.7, all steps being carried out as detailed in Example 1. To the 8 liters of filtrate obtained, an amount of 400 grams of commercial sugar + 240 ml of sunflower oil + 80 ml of corn starch + 10 grams of lecithin were added. The homogenization and sterilization were carried out as in Example 1.

The milk obtained was inoculated with 200 ml of a freshly prepared culture of *Lactobacillus bulgaricus* as a lactic culture. After vigorous mixing, the solution obtained was poured into 55 containers of 170 ml and incubated at 40°C for 20 hours. At the end of the incubation, the bottles were put in a refrigerator, the pH of the non-dairy yogurt being 3.9–4.1.

EXAMPLE 3

The milk was prepared as in Example 1 but the pH adjustment to 6.7 was made by the use of 120 ml of citric acid 0.5N. To the solution obtained, 325 grams of commercial sugar + 150 ml edible cotton oil + 40 grams of corn starch + 8 grams of lecithin were added. The homogenization and sterilization were carried out as in Example 1. The milk obtained was inoculated with 200 ml of a freshly prepared mixture of *Lactobacillus bulgaricus* (1 part) and *Streptococcus thermophilus* (2 parts) as a lactic culture. After vigorous stirring, the solution obtained was poured into several containers and incubated at 40°C for 16 hours. At the end of the incubation, the containers were put in a refrigerator, the pH of the non-dairy yogurt being 4.2–4.4.

EXAMPLE 4

The same as in Example 3 with the exception that, in the homogenization step, 1000 grams of commercial sugar + 2000 ml of plain water were added to the milk. To the sterilized milk, 4 grams of a mixture of Sunset yellow and Tartrazine (1:1) (a commercial edible colour) and 8 ml of a synthetic extract of apricot flavour were added. The experiment was continued as in Example 3, using the same mixture of *Lactobacillus bulgaricus* and *Streptococcus thermophilus* as the lactic culture. The non-dairy yogurt obtained had an apricot colour and taste.

EXAMPLE 5

The same as in Example 4, the only difference being the edible colour added which, in this experiment, was 3 grams of anaranth reinforced by 1 ml of caramel colour and the addition of 8 ml of a synthetic strawberry extract. The non-dairy yogurt obtained had a strawberry colour and taste.

I claim:

1. A method for the manufacture of non-dairy yogurt based on soybean meal which comprises the steps of (1) leaching the soybean meal with an aqueous solution having a pH in the range of 4–5; (2) removing a filtrate to provide a residual cake; (3) leaching the residual cake with an aqueous solution having a pH from above 7.0 to 10.0; (4) removing solids from the resulting solution to obtain a clear solution; (5) adjusting the pH of the clear solution to a value in the range of 6.5–7.0; (6) adding sugar to the clear solution and homogenizing thereof to produce a soymilk; (7) sterilizing the homogenized soymilk at a temperature of about 116°C; (8) inoculating the sterile soymilk with a lactic culture and (9) incubating the soymilk to obtain the non-dairy yogurt.

2. The method for the manufacture of non-dairy yogurt as in claim 1 in which the soybean meal is obtained by heating soybean meal during desolventizing below 70°C.

3. The method for the manufacture of non-dairy yogurt from soybean meal according to claim 1 wherein the leaching of the soybean meal according to step (1) is carried out with an aqueous solution containing an edible acid selected from the group consisting of citric acid, hydrochloric acid and their acidic salts.

4. The method for the manufacture of non-dairy yogurt from soybean meal according to claim 1 wherein the residual cake is leached according to step (3) with an aqueous solution containing an alkali selected from the group consisting of sodium hydroxide, sodium carbonate and potassium hydroxide.

5. The method for the manufacture of non-dairy yogurt from soybean meal according to claim 1 wherein the pH of the clear solution is adjusted to a range of 6.6–6.8 according to step (5) with an aqueous solution of an edible acid material selected from the group consisting of citric acid and hydrochloric acid.

6. The method for the manufacture of non-dairy yogurt from soybean meal according to claim 1 wherein, in the homogenization step (6) of the clear solution, various additives selected from the group consisting of water, sugar, starch, oils and lecithin are incorporated.

7. The method for the manufacture of non-dairy yogurt from soybean meal according to claim 1 wherein the inoculation of the sterilized soymilk according to step (8) is carried out with a lactic culture grown on a non-dairy medium selected from the group consisting of Streptococcus thermophilus and Lactobacillus bulgaricus or their mixtures.

8. Non-dairy yogurt product when manufactured by the method according to claim 1.

* * * * *